United States Patent [19]

Yamato et al.

[11] Patent Number: 5,610,262
[45] Date of Patent: *Mar. 11, 1997

[54] PROCESS FOR PRODUCING POLYCARBONATE

[75] Inventors: Tsutomu Yamato; Yasuhiro Oshino; Yutaka Fukuda; Tatsuya Kanno; Takaaki Kuwana, all of Hyogo, Japan

[73] Assignee: Daicel Chemical Industries, Ltd., Sakai, Japan

[*] Notice: The term of this patent shall not extend beyond the expiration date of Pat. No. 5,432,250.

[21] Appl. No.: 418,510

[22] Filed: Apr. 7, 1995

Related U.S. Application Data

[60] Division of Ser. No. 978,209, Nov. 18, 1992, Pat. No. 5,432,250, and a continuation-in-part of Ser. No. 946,335, Nov. 2, 1992, Pat. No. 5,418,314.

[30] Foreign Application Priority Data

Mar. 13, 1991 [JP] Japan .................................. 3-127018
Mar. 13, 1991 [JP] Japan .................................. 3-127019

[51] Int. Cl.$^6$ ......................... C08G 64/30; C08G 63/78
[52] U.S. Cl. ......................... 528/196; 528/198; 528/481; 528/502 R; 526/65
[58] Field of Search .................................. 528/196, 198, 528/481, 502 R; 526/65

[56] References Cited

U.S. PATENT DOCUMENTS 5,418,314  5/1995  Yamoto et al. .................... 528/196
5,432,250  7/1995  Yamato et al. .................... 528/196

*Primary Examiner*—James J. Seidleck
*Assistant Examiner*—P. Hampton-Hightower
*Attorney, Agent, or Firm*—Flynn, Thiel, Boutell & Tanis, P.C.

[57] ABSTRACT

In a process for producing a polycarbonate by subjecting a dihydroxy compound and a diester of carbonic acid to melt polycondensation through transesterification, after a polycarbonate prepolymer is prepared in the first-stage reaction, polycondensation is conducted as the second-stage reaction in a residence time in the range of from 15 to less than 60 min or through the use of at least one paddle-type self-cleaning twin-screw extruder This process enables a colorless, transparent polycarbonate having a high molecular weight to be produced at a high efficiency on an industrial scale.

4 Claims, No Drawings

PROCESS FOR PRODUCING POLYCARBONATE

This is a division of Ser. No. 07/978 209, filed Nov. 18, 1992, now U.S. Pat. No. 5,432,250 which is a continuation-in-part of Ser. No. 07/946 335, filed Nov. 2, 1992 now U.S. Pat. No. 5,418,314.

FIELD OF INDUSTRIAL APPLICATION

The present invention relates to a process for producing a polycarbonate. More particularly, the present invention is concerned with a process for producing a polycarbonate by subjecting a dihydroxy compound and a bisaryl carbonate to melt polycondensation through transesterification.

BACKGROUND ART

Polycarbonates are a general-purpose engineering thermoplastic and have found a wide range of applications, particularly in injection molding or a glass sheet as an alternative to a windowpane.

Interfacial polycondensation, transesterification and other methods have hitherto been applied to the production of these polycarbonates. Although interfacial polycondensation is generally effective for the production of a polycarbonate, it has drawbacks such as the use of toxic phosgene as a starting compound for the reaction and the remaining of chlorine ions generated during the reaction in the resultant polycarbonate.

In order to eliminate the above-described drawbacks of the interfacial polycondensation, Japanese Patent Publication-A No. 182336/1988 discloses a process for producing a polycarbonate wherein a liquid trichloromethyl chloroformate as a dimer of phosgene is used instead of the toxic phosgene and subjected to interfacial polycondensation with a special dihydric phenol. This document, however, cities only 9,9-bis(4-hydroxyphenyl)fluorenes as the special dihydric phenol.

Angew. Chem., 99, 922 (1987) and German Patent DE 3440141 describe a process for producing a polycarbonate wherein triphosgene is used instead of the toxic phosgene and reacted with 2,2-bis(4-hydroxyphenyl)propane. This process, however, involves also a reaction mechanism whereby phosgene is generated.

In a process for producing a polycarbonate known in the art regarding the transesterification, a high-molecular-weight polycarbonate is produced by adding a transesterification catalyst to diphenyl carbonate and an aromatic dihydroxy compound as the starting compounds for the reaction, heating the mixture under reduced pressure to prepare a prepolymer while distilling off phenol and finally heating the prepolymer to 290° C. or above in a high vacuum to distill off phenol (see U.S. Pat. No. 4,345,062). However, it is known that, unlike other engineering plastics, the melt viscosity of the high-molecular-weight polycarbonate is so high that the reaction should be conducted at a temperature as high as 290° C. or above and that a high vacuum ($10^{-2}$ Torr) is necessary for distilling off phenol having a high boiling point, so that the industrialization of this process is difficult also from the viewpoint of facilities, and the remaining of phenol in the resultant polycarbonate has an adverse effect on the hue and properties of the polycarbonate.

However, various studies have been made on the transesterification because it can be conducted through melt polycondensation and is a technique excellent in the profitability from the viewpoint of industry. In particular, since the viscosity of the reaction system becomes high when the polycondensation approaches completion, attempts have been made to use various types of apparatuses for the purpose of treating a reaction product having a high viscosity (Japanese Patent Publication-B No. 36159/1977 and Japanese Patent Publication-A Nos. 86618/1990 and 153923 to 153927/1990).

In the Japanese Patent Publication-B No. 36159/1977, the use of an intermeshing twin-screw extruder of a screw evaporator type is disclosed. This extruder, however, has problems of liability to form a black foreign matter in the residence section of screw grooves, the difficulty of controlling the residence time, the occurrence of coloring of the product due to the heating and the difficulty of efficiently removing distillates such as phenol as a by-product.

In the Japanese Patent publication-A Nos. 153923 to 153927/1990, use is made of a horizontal agitating polymerization tank. When this tank is used, although a large hold-up volume can be attained, the solution thickness becomes so large that it becomes difficult to distill off phenol as the by-product from the reaction mixture having a high viscosity. This determines the rate of the reaction, and consequently the residence time should be prolonged. A long residence time means that the formed polycarbonate is exposed to a high temperature for a long period of time, which is causative of the coloring of the reaction product.

Thus, the conventional transesterification process is unsatisfactory for efficiently producing a colorless, transparent polycarbonate having a high molecular weight on an industrial scale.

DISCLOSURE OF THE INVENTION

The present invention eliminates the above-described drawbacks of the conventional process for producing a polycarbonate through transesterification and provides a process for producing a colorless, transparent polycarbonate having a high molecular weight at high efficiency.

According to the first embodiment of the present invention, there is provided a process for producing a polycarbonate by subjecting a dihydroxy compound and a diester of carbonic acid to melt polycondersation by transesterification, characterized in that after a polycarbonate prepolymer is prepared in the first-stage reaction, polycondensation is conducted as the second-stage reaction in a residence time in the range of from 15 to less than 60 min.

According to the second embodiment of the present invention, there is provided a process for producing a polycarbonate by subjecting a dihydroxy compound and a diester of carbonic acid to melt polycondersation by transesterification, characterized in that after a polycarbonate prepolymer is prepared in the first-stage reaction, polycondensation is conducted as the second-stage reaction through the use of at least one paddle-type self-cleaning twin-screw extruder The present invention will now be described in more detail.

At the outset, the starting compounds for the reaction (monomers) will be described.

In the present invention, a wide variety of compounds may be used as the dihydroxy compound, and examples thereof include bis(hydroxyaryl)alkanes, bis(hydroxaryl)arenes, bis(hydroxyaryl)cycloalkanes, dihydroxydiaryl ethers, dihydroxydiaryl sulfides, dihydroxydiaryl sulfoxides and dihydroxydiaryl sulfones.

Among them, preferred dihydroxy compounds are compounds represented by the following general formulae (I), (II) and (III):

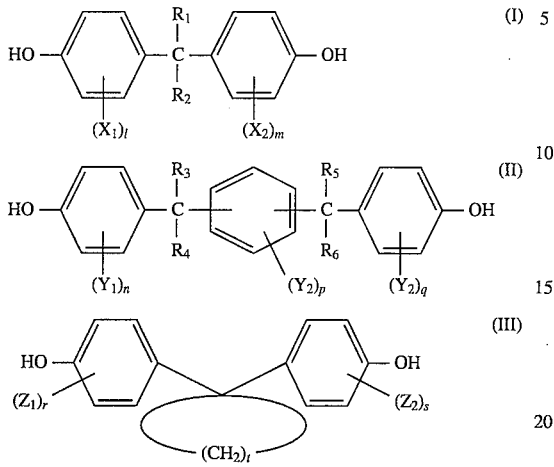

(wherein $R_1$, $R_2$, $R_3$, $R_4$, $R_5$ and $R_6$ which may be the same or different each stand for a hydrogen atom, an alkyl group, a cycloalkyl group, an aralkyl group or an aryl group, $X_1$, $X_2$, $Y_1$, $Y_2$, $Y_3$, $Z_1$ and $Z_2$ which may be the same or different each stand for a halogen atom, an alkoxy group, an alkyl group, a cycloalkyl group, an aralkyl group or an aryl group, l, m, n, p, q, r and s are each an integer of 0 to 4 and t is an integer of 2 to 10).

Examples of the alkyl group include straight-chain or branched alkyl groups such as methyl, ethyl, n-propyl, isopropyl, n-butyl, isobutyl, tert-butyl, n-pentyl, isopentyl, neopentyl, hexyl, heptyl, octyl, 2-ethylhexyl, decyl, undecyl and dodecyl groups. The alkyl group is preferably a straight-chain or branched alkyl group having about 1 to 8 carbon atoms.

Examples of the cycloalkyl group include cyclopropyl, cyclopentyl, cyclohexyl, cycloheptyl and cyclooctyl groups.

Examples of the aralkyl group include benzyl, phenethyl and benzhydryl groups. Examples of the aryl group include phenyl, naphthyl and anthryl groups. The aryl group is preferably a phenyl group.

Examples of the halogen atom include fluorine, chlorine, bromine and iodine atoms. Examples of the alkoxy group include methoxy, ethoxy, n-propoxy, isopropoxy, n-butoxy, isobutoxy, pentyloxy and hexyloxy groups.

The above-described alkyl, cycloalkyl, aryl and aralkyl groups may have at least one substituent inert under reaction conditions. Examples of such a substituent include a halogen atom, an alkoxy group, an aryloxy group, an aralkyloxy group, an alkylthio group, a cyano group and a nitro group.

The dihydroxy compound is preferably a compound represented by the general formulae (I), (Ii) or (ili) wherein the substituents $R_1$ to $R_6$ each stand for a hydrogen atom, an alkyl group (particularly an alkyl group having 1 to 8 carbon atoms) or an aryl group (particularly a phenyl group) and the substituents $X_1$, $X_2$, $Y_1$, $Y_2$, $Y_3$, $Z_1$ and $Z_2$ each stand for an alkyl group (particularly an alkyl group having 1 to 8 carbon atoms), an aryl group (particularly a phenyl group) or a halogen atom.

Compounds represented by the following general formulae (IV), (V), (VI) and (VII) as well are preferred as the dihydroxy compound:

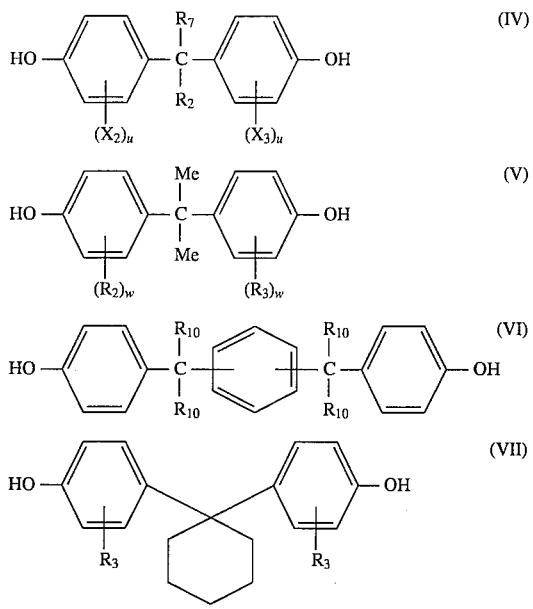

(wherein $R_7$, $R_8$, $R_9$ and $R_{10}$ each stand for a hydrogen atom, a straight-chain or branched alkyl group having 1 to 8 carbon atoms or a phenyl group, $X_3$ stands for a halogen atom, u is 0 to 4 and w is 1 to 4).

Examples of the dihydroxy compound to be used in the present invention include 2,2-bis-(4-hydroxy-phenyl)propane, 2,2-bis(4-hydroxyphenyl)butane, 2,2-bis(4-hydroxyphenyl)-4-methylpentane, 2,2-bis(4-hydroxyphenyl)octane, 4,4'-dihydroxy-2,2,2-triphenylethane, 2,2-bis(3,5-dibromo-4-hydroxyphenyl)propane, 2,2-bis(4-hydroxy-3-methylphenyl)propane, 2,2-bis(4-hydroxy-3-isopropylphenyl)propane, 2,2-bis(4-hydroxy-3-sec.butylphenyl)propane, 2,2-bis(3,5-dimethyl-4-hydroxyphenyl)propane, 2,2-bis(4-hydroxy-3-tert-butylphenyl)propane, 1,1'-bis(4-hydroxyphenyl)-p-diisopropylbenzene, 1,1'-bis(4-hydroxyphenyl)-m-diisopropylbenzene and 1,1-bis(4-hydroxyphenyl)cyclohexane. It is also possible to produce a copolycarbonate through the use of a combination of two or at least three of the above-described dihydroxy compounds.

Examples of the diester of carbonic acid to be used in the present invention include bisaryl carbonates such as diphenyl carbonate, bis(2,4-dichlorophenyl) carbonate, bis(2,4,8-trichlorophenyl). carbonate, bis(2-cyanophenyl) carbonate, bis(o-nitrophenyl) carbonate, ditolyl carbonate, m-cresyl carbonate, dinaphthyl carbonate and bis (phenyl) carbonate; dicycloalkyl carbonates such as dicyclohexyl carbonate; and dialkyl carbonates such as dimethyl carbonate and diethyl carbonate. Among these diesters of carbonic acid, bisaryl carbonates are preferred, and diphenyl carbonate is particularly preferably used.

Regarding the proportions of the starting compounds for the reaction, the diester of carbonic acid is generally used in an amount of 0.90 to 1.50 mol, preferably 0.95 to 1.25 mol, still preferably about 1.00 to 1.01 mol based on one mole of the dihydroxy compound.

In the present invention, if necessary, use may be made of a polymerization catalyst, and when a polymerization catalyst is used, it may be any conventional transesterification catalyst.

Representative examples of the transesterification catalyst useable in the present invention include (a) catalysts belonging to a metal-containing catalyst, such as lithium borohydride, sodium borohydride, potassium borohydride, rubidium borohydride, cesium borohydride, beryllium borohydride, magnesium borohydride, calcium borohydride, strontium borohydride, barium borohydride, aluminum borohydride, titanium borohydride, tin borohydride, germanium borohydride, tetraphenoxylithium, tetraphenoxysodium, tetraphenoxypotassium, tetraphenoxyrubidium, tetraphenexycesium, sodium thiosulfate, beryllium oxide, magnesium oxide, tin (IV) oxide, dibutyltin oxide, beryllium hydroxide, magnesium hydroxide, germanium hydroxide, beryllium acetate, magnesium acetate, tin (IV) acetate, germanium acetate, lithium carbonate, sodium carbonate, potassium carbonate, beryllium carbonate, magnesium carbonate, tin (IV) carbonate, germanium carbonate, tin (IV) nitrate, germanium nitrate, antimony trioxide and bismuth trimethylcarboxylate.

As (b) catalysts belonging to an electron-donating amine compound, N,N-dimethyl-4-aminopyridine, 4-diethylaminopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, aminoquinoline, imidazole, 2-methylimidazole, 4-methylimidazole, diazabicyclooctane (DABCO) and the like are cited.

Further, the examples of the catalyst include (c) carbonate, acetate, formate, nitrate, nitrite, oxalate, fluoroborate, hydrofluoride, etc., of the above electron-donating amine compound.

As (d) catalysts belonging to an electron-donating phosphorus compound, triethylphosphine, tri-n-propylphosphine, triisopropylphosphine, tri-n-butylphosphine, triphenylphosphine, tri-o-dimethoxyphenylphosphine, tri-p-tolytphosphine, tri-o-tolylphosphine, tributyl phosphite, triphenyl phosphite, tri-p-tolyl phosphite, tri-o-tolyl phosphide and the like are cited.

Furthermore, (e) catalysts belonging no a borane complex include complexes comprising borane and a following compound, that is, ammonia, dimethylamine, trimethylamine, triethylamine, tert-butylamine, dimethylaniline, pyridine, dimethylaminopyridine, morpholine, piperazine, pyrrole, tetrahydrofuran, dimethyl sulfide, tri-n-butylphosphine, triphenylphosphine, triphenyl phosphite or the like.

These catalysts may be used alone or in a combination of two or more of them. The amount of use thereof may be usually in the range of from $1\times10^{-8}$ or $1\times10^{-6}$ to 1 mol, preferably $5\times10^{-7}$ or $5\times10^{-5}$ to $5\times10^{-2}$ mol based on one mole of the dihydroxy compound. When the amount of use of the catalyst is less than $5\times10^{-7}$ or $5\times10^{-5}$ mol, the rate of polymerization becomes low, which often gives rise to coloring of the reaction product. When the amount exceeds $5\times10^{-2}$ mol, the catalyst remains in the resultant polycarbonate which often gives an adverse effect on the properties, for example, a lowering in the mechanical properties.

The catalyst may be fed at once in an early stage of the first-stage reaction. Alternatively, proper catalysts may be used respectively in the first-stage reaction and the second-stage reaction.

The present invention is directed to a process for producing a polycarbonate through the transesterification of the above-described starting compounds for the reaction. In the present invention, use is made of a two-stage reaction system. Specifically, the process of the present invention comprises the first-stage reaction wherein the above-described starting compounds are transesterified with each other in a molten state optionally in the presence of a transesterification catalyst to give a polycarbonate prepolymer and the second-stage reaction wherein the polycondensation is further allowed to proceed under a highly viscous condition to give a polycarbonate having a high molecular weight.

In the present invention, there is no particular limitation on the reaction conditions for the first-stage reaction. However, the reaction temperature is usually in the range of from 100° to 300° C., preferably in the range of from 130° to 280° C. When the reaction temperature is below 130° C., the rate of reaction becomes low, while when the reaction temperature exceeds 280° C., side reactions are liable to occur. is preferred to conduct the reaction in an inert atmosphere In the first-stage reaction, phenol or the like is produced as a by-product accompanying the advance of the reaction. Such a by-product may be distilled off under reduced pressure.

In the present invention, although there is no particular limitation on the method of conducting the first-stage reaction, it is preferred to conduce the first-stage reaction through any one of the following methods (a) to (i).

(a) A method wherein the starting compounds for the reaction are subjected to polycondensation in a molten state in at least one vessel-type reactor while distilling off phenol or other compound produced in the reaction.

(b) A method which comprises the first step subjecting the starting compounds for the reaction polycondensation in a molten state in at least one vessel-type reactor to give a polycarbonate prepolymer having a viscosity-average molecular weight of 5,000 to 20,000 while distilling off phenol or other compound produced in the reaction, the second step placing the prepolymer produced in the first step in at least one hold tank, and the third step of introducing the prepolymer produced in the second step through at least one preheater into a vacuum flash chamber, where the prepolymer is subjected to polycondensation while distilling off phenol or other compound produced in the reaction to give a polycarbonate prepolymer having a viscosity-average molecular weight of 10,000 to 30,000.

(c) A method which comprises the first step of subjecting the starting compounds for the reaction to polycondensation in a molten state in at least one vessel-type reactor to give a polycarbonate prepolymer having a viscosity-average molecular weight of 5,000 to 20,000 while distilling off phenol or other compound produced in the reaction and the second step of introducing the prepolymer produced in the first step through at least one preheater into a vacuum flash chamber, where the prepolymer is subjected to polycondensation while distilling off phenol or other compound produced in the reaction to give a polycarbonate prepolymer having a viscosity-average molecular weight of 10,000 to 30,000.

(d) A method which comprises the first step of melting the starting compounds for the reaction in a vessel for melting starting compounds, the second step of subjecting the starting compounds for the reaction to polycondensation in a horizontal twin-shaft polymerizer to give a polycarbonate propolymer having a viscosity-average molecular weight of 5,000 to 30,000 while distilling off phenol or other compound produced in the reaction, and the third step of placing the propolymer produced in the second step in at least one hold tank.

(e) A method which comprises the first step of melting the starting compounds for the reaction in a vessel for melting starting compounds and the second step of subjecting the starting compounds for the reaction to polycondensation in a horizontal twinshaft polymerizer to give a polycarbonate propolymer having a viscosity-average molecular weight of 5,000 to 30,000 while distilling off phenol or other compound produced in the reaction.

(f) A method which comprises the first step of subjecting the starting compounds for the reaction to polycondensation in a molten state in at least one vessel-type reactor to give a polycarbonate propolymer having a viscosity-average molecular weight of 5,000 to 20,000 while distilling off phenol or other compound produced in the reaction, the second step of placing the propolymer produced in the first step in at lease one hold tank, and the third step of subjecting the prepolymer to polycondensation in at least one vented extruder while distilling off phenol or other compound produced in the reaction to give a polycarbonate prepolymer having a viscosity-average molecular weight of 10,000 to 30,000.

(g) A method which comprises the first step of subjecting the starting compounds for the reaction to polycondensation in a molten state in at least one vessel-type reactor to give a polycarbonate prepolymer having a viscosity-average molecular weight of 5,000 to 20,000 while distilling off phenol or other compound produced in the reaction and the second step of subjecting the prepolymer to polycondensation in at least one vented extruder while distilling off phenol or other compound produced in the reaction to give a polycarbonate prepolymer having a viscosity-average molecular weight of 10,000 to 30,000.

(h) A method which comprises the first step of melting the starting compounds for the reaction in a vessel for melting the starting compounds and the second step of subjecting the starting compounds for the reaction to polycondensation in at least one vessel-type reactor to give a polycarbonate prepolymer having a viscosity-average molecular weight of 5,000 to 30,000 while distilling off phenol or other compound produced in the reaction.

(i) A method which comprises the first step of melting the starting compounds for the reaction in a vessel for melting the starting compounds, the second step of subjecting the starting compounds for the reaction to polycondensation in at least one vesseltype reactor to give a polycarbonate prepolymer having a viscosity-average molecular weight of 5,000 to 20,000 while distilling off phenol or other compound produced in the reaction and the third step of allowing the polycondensation of the prepolymer produced in the second step to further proceed in at least one vessel-type reactor or horizontal polymerizer while distilling off phenol or other compounds produced in the reaction to give a polycarbonate prepolymer having a viscosity-average molecular weight of 10,000 to 30,000.

The above-described methods (a) to (i) will now be described in more detail.

(a) A method wherein the starting compounds for the reaction are subjected to polycondensation in a molten state in at lease one vessel-type reactor while distilling off phenol or other compound produced in the reaction:

The method (a) may be conducted either batchwise or continuously. When the reaction is conducted batchwise, the vessel-type reactor to be used may be a usual one equipped with an agitator. The reaction may be conducted through the use of either one or a plurality of such reactors. Examples of the agitator include those equipped with turbine blades, paddle blades, anchor blades, helical ribbon blades and modified types of the above-described blades. The agitator is particularly preferably one equipped with helical ribbon blades or an improved type of the helical ribbon blade which can be used in a high-viscosity vessel from the viewpoint of the molecular weight distribution and the shortening of the time for the reaction product to be held at a high temperature.

In the latter stage of the reaction, the viscosity of the reaction product becomes so high that the use of an agitator for a high viscosity equipped with blades such as paddle blades, grid blades or helicon blades is also favorable.

The vessel-type reactor to be used herein is preferably one provided with a distillation column. The distillation column is useful for avoiding the escape of the starting compounds from the system together with by-products such as phenol in the removal of them as much as possible.

In the method (a), after a dihydroxy compound and a diester of carbonic acid as the starting compounds for the reaction are melted in an inert atmosphere, preferably a nitrogen atmosphere, in the above-described vessel-type reactor, a transesterification catalyst is added thereto and a reaction is allowed to proceed while agitating. With the advance of the reaction, the temperature is gradually raised and the pressure is gradually reduced to distill off phenol produced as a by-product.

In order to compensate for the loss of quantity of heat due to the latent heat of vaporization which occurs with the elimination of a by-product such as phenol, a draft tube or the like is provided with the reaction vessel for the purpose of supplying the heat.

In practicing the method (a), the reaction temperature and the degree of vacuum are preferably in the range of from 150° to 300° C. and in the range of from 400 to 1 Torr, respectively.

The viscosity-average molecular weight of the polycarbonate prepolymer produced by the method (a) is usually 5000 to 20,000.

(b) A method which comprises the first step of subjecting the starting compounds for the reaction to polycondensation in a molten state in at least one vessel-type reactor to give a polycarbonate prepolymer having a viscosity-average molecular weight of 5,000 of 20,000 while distilling off phenol or other compound produced in the reaction, the second step of placing the prepolymer produced in the first step in at least one hold tank, and the third step of introducing the prepolymer produced in the second step through at least one preheater into a vacuum flash chamber, where the prepolymer is subjected to polycondensation while distilling off phenol or other compound produced in the reaction to give a polycarbonate prepolymer having a viscosity-average molecular weight of 10,000 to 30,000:

The first step of this method corresponds to the method (a).

In the second step, the prepolymer produced in the first step is placed in a hold tank.

In the hold tank, the prepolymer is maintained in a molten state and optionally agitated by means of an agitator to homogenize the prepolymer. In this case, it is possible to supply additives, such as a hue improver, an antioxidant and a catalyst terminal protecting agent, in such an amount as will have no adverse effect on the reaction in the subsequent step, and this method is included in the scope of the present invention.

In the third step, the prepolymer from the second step is introduced through at least one preheater into a vacuum flash chamber, where polycondensation is allowed to proceed while distilling off phenol or other compound produced in the reaction.

Examples of the preheater include multi-tubular, double-pipe, platy, static mixer and other heat exchangers. In the third step, the prepolymer is heated through the use of these preheaters and fed into a vacuum flash chamber, where polycondensation is allowed to proceed while evaporating by-products such as phenol under reduced pressure.

In the vacuum flash chamber, the reaction temperature and the degree of vacuum are usually 200° to 820° C. and 50 to 0.5 Torr, respectively.

The viscosity-average molecular weight of the polycarbonate prepolymer produced by the method (b) is usually 10,000 to 30,000.

(c) A method which comprises the first step of subjecting the starting compounds for the reaction to polycondensation in a molten state in at least one vessel-type reactor to give a polycarbonate prepolymer having a viscosity-average molecular weight of 5,000 to 20,000 while distilling off phenol or other compound produced in the reaction and the second step of introducing the prepolymer produced in the first step through at least one preheater into a vacuum flash chamber, where the prepolymer is subjected to polycondensation while distilling off phenol or other compound produced in the reaction to give a polycarbonate prepolymer having a viscosity-average molecular weight of 10,000 to 30,000:

The method (c) is the same as the method (b), except that the second step is omitted. Specifically, in the method (c), the prepolymer produced in the first step is directly introduced through at least one preheater into a vacuum chamber, where the polycondensation is further allowed to proceed while distilling off the by-products, thereby preparing a polycarbonate prepolymer having a viscosity-average molecular weight of 10,000 to 30,000.

(d) A method which comprises the first step of melting the starting compounds for the reaction in a vessel for melting starting compounds, the second step of subjecting the starting compounds for the reaction to polycondensation in a horizontal twin-shaft polymerizer to give a polycarbonate prepolymer having a viscosity-average molecular weight of 5,000 to 30,000 while distilling off phenol or other compound produced in the reaction, and the third step of placing the prepolymer produced in the second step in at least one hold tank:

The vessel for melting the starting compounds to be used in the first step may be a conventional agitation vessel. In the first step, the starring compounds for the reaction may be melted while agitating at a proper temperature selected according to the starting compounds for the reaction.

In the second step, a polycarbonate prepolymer is produced through the use of a horizontal twin-shaft polymerizer.

The second step may be conducted either batchwise or continuously. Further, the reaction may be conducted through the use of a plurality of horizontal twin-shaft polymerizers.

The term "horizontal twin-shaft polymerizer" used herein is intended to mean a polymerizer having two horizontal shafts of rotation equipped with disk, pin, spectacle, wheel or other type of blades.

When use is made of a plurality of horizontal twin-shaft polymerizers, in the latter stage of the reaction, it is preferred to use a polymerizer of a high hold type among the horizontal polymerizers wherein the residence time is one hour or more.

The horizontal twin-shaft polymerizer to be used herein is preferably one provided with a distillation column. The distillation column is useful for avoiding the escape of the starting compounds from the system together with by-products such as phenol in the removal of them as much as possible.

In the second step, a dihydroxy compound and a diester of carbonic acid as the starting compounds for the reaction are reacted with each other in a molten state in an inert atmosphere, preferably in a nitrogen atmosphere, in the presence of a transesterification catalyst in the above-described horizontal twin-shaft polymerizer. When the second step is conducted batchwise, the temperature is gradually raised and the pressure is gradually reduced with the advance of the reaction to distill off phenols produced as the by-product.

Further, in order to compensate for the loss of quantity of heat due to the latent heat of vaporization which occurs with the elimination of a by-product such as phenol, a draft tube or the like is provided with the reaction vessel for the purpose of supplying the heat.

In the second step, the reaction temperature and the degree of vacuum are preferably 150° to 300° C. and 400 to 1 Torr, respectively. The viscosity-average molecular weight of the polycarbonate prepolymer produced in the second step is usually 5,000 to 20,000.

In the third step, the prepolymer produced in the second step is placed in a hold tank. This step is the same as the second step of the method (b).

The viscosity-average molecular weight of the polycarbonate prepolymer produced by the method (d) is usually 10,000 to 30,000.

(e) A method which comprises the first step of melting the starting compounds for the reaction in a vessel for melting starting compounds and the second step of subjecting the starting compounds for the reaction to polycondensation in a horizontal twinshaft polymerizer to give a polycarbonate prepolymer having a viscosity-average molecular weight of 5,000 to 30,000 while distilling off phenol or other compound produced in the reaction:

The method (e) is the same as the method (d), except that the third step is omitted, that is, comprises the first and second steps of the method (d).

The viscosity-average molecular weight of the polycarbonate propolymer produced by the method (e) is usually 10,000 to 30,000.

(f) A method which comprises the first step of subjecting the starting compounds for the reaction to polycondensation in a molten state in at least one vessel-type reactor to give a polycarbonate propolymer having a viscosity-average molecular weight of 5,000 to 20,000 while distilling off phenol or other compound produced in the reaction, the second step of placing the propolymer produced in the first step in at least one hold tank, and the third step of subjecting the propolymer to polycondensation in at least one vented extruder while distilling off phenol or other compound produced in the reaction to give a polycarbonate propolymer having a viscosity-average molecular weight of 10,000 to 30,000:

The first and second steps of this method are the same as the first and second steps of the method (b), respectively.

In the third step, the propolymer produced in the second step is introduced into at least one vented extruder, where the polycondensation is allowed to proceed while distilling off phenol or other compound produced in the reaction.

The vented extruder may be a single-screw or twin-screw extruder, and monovented, two-vented and other extruders are known in the art. In this step, use may be made of a conventional single-screw monovented extruder which is advantageous from the viewpoint of the cost.

In the vented extruder, the reaction temperature and the degree of vacuum are usually 200° to 320° C. and 50 to 0.5 Torr, respectively.

The viscosity-average molecular weight of the polycarbonate prepolymer produced by the method (f) is usually 10,000 to 30,000.

(g) A method which comprises the first step of subjecting the starting compounds for the reaction to polycondensation in a molten state in at least one vessel-type reactor to give a polycarbonate prepolymer having a viscosity-average molecular weight of 5,000 of 20,000 while distilling off phenol or other compound produced in the reaction and the second step of subjecting the prepolymer to polycondensation in at least one vented extruder while distilling off phenol or other compound produced in the reaction to give a polycarbonate prepolymer having a viscosity-average molecular weight of 10,000 to 30,000:

The method (g) is the same as that of the method (f), except that the second step is omitted. Specifically, in the method (g), the prepolymer produced in the first step is directly introduced into at least one vented extruder, where the polycondensation is further allowed to proceed while distilling off the by-products, thereby preparing a polycarbonate prepolymer having a viscosity-average molecular weight of 10,000 to 30,000.

(h) A method which comprises the first step of melting the starting compounds for the reaction in a vessel for melting the starting compounds and the second step of subjecting the starting compounds for the reaction to polycondensation in at least one vessel-type reactor to give a polycarbonate prepolymer having a viscosity-average molecular weight of 5,000 to 30,000 while distilling off phenol or other compound produced in the reaction:

The first step of this method is the same as the first step of the method (d).

The second step corresponds to the method (a). In this case, however, it is preferred to conduct the reaction in the second step of the method (h) under the conditions of a temperature in the range of from 130° to 300° C. and a pressure in the range of from 400 to 0.5 Torr.

The viscosity-average molecular weight of the polycarbonate propolymer produced by the method (h) is usually 5,000 to 30,000.

(i) A method which comprises the first step of melting the starting compounds for the reaction in a vessel for melting the starting compounds, the second stop of subjecting the starting compounds for the reaction to polycondensation in at least one vessel-type reactor to give a polycarbonate propolymer having a viscosity-average molecular weight of 3,000 to 20,000 while distilling off phenol or other compound produced in the reaction and the third step of allowing the polycondensation of the propolymer produced in the second step to further proceed in at least one vessel-type reactor and/or at least one horizontal polymerizer while distilling off phenol or other compound produced in the reaction to give a polycarbonate propolymer having a viscosity-average molecular weight of 10,000 to 30,000:

The first and second steps of this method are the same as the first and second steps of the method (h), except that in the second step, the reaction is conducted under such a condition that the resultant polycarbonate propolymer has a viscosity-average molecular weight of 5,000 to 20,000.

In the third step, use is made of a vessel-type reactor and/or a horizontal polymerizer, and the polycondensation of the polycarbonate prepolymer. produced in the second step is further allowed to proceed. In this step, the removal of phenol or other compound formed in the reaction is also conducted.

When the third step is conducted in a vessel-type reactor, fundamentally, the procedure of the second step may be repeated. In this case, however, since the polycarbonate as the starting compound has a viscosity-average molecular weight of 5,000 to 20,000, it is favorable to use a vessel-type reactor provided with an agitator for a high viscosity having paddle blades, grid blades, helicon blades or other blades.

On the other hand, when the third step is conducted in a horizontal polymerizer, use is made of a high hold type horizontal polymerizer which has one or two horizontal shafts of rotation equipped with disk, pin, spectacle, wheel or other blades and is generally used in a residence time of one hour or more.

The third step may be conducted either batchwise or continuously. Further, it is also possible to conduct the reaction through the use of a plurality of vessel-type reactors and horizontal polymerizers.

The vessel-type reactor and horizontal polymerizer are preferably ones provided with a distillation column. The distillation column is useful for avoiding the escape of the starting compounds from the system together with by-products such as phenol in the removal of them as much as possible.

In order to compensate for the loss of quantity of heat due to the latent heat of vaporization which occurs with the elimination of a by-product such as phenol, a draft tube or the like may be provided with the vessel-type reactor and horizontal polymerizer for the purpose of supplying the heat.

In the third step, the reaction temperature and the degree of vacuum are preferably in the range of from 200° to 320° C. and 10 to 0.5 Torr, respectively.

The viscosity-average molecular weight of the polycarbonate prepolymer produced by the method (i) is usually 10,000 to 30,000.

According to the process of the present invention, after a polycarbonate prepolymer is produced in the above-described first-stage reaction, the second-stage reaction is conducted to give a polycarbonate having a high molecular weight.

In the step of the post-condensation (second-stage reaction), as the polycondensation approaches the completion, the viscosity of the reaction system becomes so high that it is necessary to conduct the treatment at a high temperature. Further, in order to increase the molecular weight, it was very important to find a method which enables side reactions (formation of a coloring source) due to an oxidative deterioration to be prevented while distilling off by-products, etc.

As a result of extensive studies, the present inventors have found that a high-molecular weight polycarbonate free from coloring can be obtained by conducting the polycondensation in a residence time in the range of from 15 to less than 60 min in the step of post-condensation (second-stage reaction) and conducting the step of post-condensation in a solution thickness in the range of from 0.1 to 50 mm (the first embodiment of the present invention).

The term "residence time" used herein is intended to mean a period of time which contributes to the potycondensation in a high vacuum at a high temperature. When the residence time is less than 15 min, the removal of by-products becomes unsatisfactory, so that it is impossible to increase the molecular weight. On the other hand, when the residence time is 60 min or more, there is a high possibility that the coloring may proceed due to the side reaction, etc., unfavorably.

The solution thickness is preferably 0.1 to 50 mm from the viewpoint of efficiently removing by-products. When the solution thickness is less than 0.1 mm, it is difficult to attain a satisfactory profitability on an industrial scale. On the other hand, when the solution thickness exceeds 50 mm, it becomes difficult to remove by-products. In an actual apparatus, the present invention includes an embodiment wherein the solution thickness in the reaction section is locally 0.1 to 50 mm.

In the second-stage reaction in the process according to the first embodiment of the present invention, the reaction temperature is preferably in the range of from 180° to 850° C., still preferably in the range of from 200° to 320° C. When the temperature is below 200° C., it is often difficult to conduct the removal of phenol and other by-product necessary for increasing the molecular weight. On the other hand, when the temperature exceeds 320° C., the coloring of the resin and the side reactions are accelerated unfavorably.

The reaction is preferably conducted in a high vacuum, and the degree of vacuum is preferably 10 Torr or less, still preferably 1 Torr or less.

There is no particular limitation on the apparatus to be used in the second-stage reaction in the process according to the first embodiment of the present invention so far as it can be used in this application. Examples of the apparatus include high-viscosity treatment apparatuses such as a paddle-type self-cleaning twin-screw extruder, a (forced) thin-film evaporator and a horizontal twin-shaft polymerizer, among which the paddle-type self-cleaning twin-screw extruder is preferred.

In contrast, in the second embodiment of the present invention, the conventional problems of the occurrence of black scorched foreign matter and the failure in producing a polymer having a sufficiently high molecular weight can be solved by examining the second-stage-reaction from the viewpoint of the apparatus.

Namely, in the process according to the second embodiment of the present invention, the above-described problems can be solved through conducting polycondensation reaction with at least one paddle-type self-cleaning twin-screw extruder in the step of post-condensation (second-stage reaction).

The term "paddle" used herein is intended to mean a discontinuous blade (that is, a blade whose bottom is not continuous with the bottom of an adjacent blade) as opposed to a screw. Although examples of the form include a convex lens and a pseudo-triangle, the form of the paddle is not limited to those only.

By the term "self-cleaning" is meant a function brought about when a pair of paddles built in two shafts, each in one shaft, have phases shifted from each other in such a manner that they rotate while keeping a constant minute gap between them so that the head of one paddle cleans the side of the other paddle.

In the self-cleaning twin-screw extruder to be used in the present invention, the L/D value (wherein L represents the length of the shaft and D represents the diameter of rotation of the paddle) is usually in the range of from 1 to 35, preferably 1 to 20. In the present invention, the L/D value is not always limited to the above range.

In order to promote the kneading effect, use may be made of a twin-screw extruder having such a blade structure that a plurality of blades can be rotated so as to be different from each other in the number of revolutions and have a self-cleaning function. In this case, the extruder is operated under such a condition that the blades are different from each other in the number of revolutions, that is, under such a condition that the number of revolutions of the blade provided in one shaft are different from the number of revolutions of the blade provided in the other shaft.

Further, in the paddle-type self-cleaning twin-screw extruder to be used in the present invention, the shafts may be provided horizontally parallel to each other or vertically parallel to each other.

The use of the paddle-type self-cleaning twin-screw extruder enables the conditions of the renewal of the surface and the solution thickness to be set so that phenol and other by-product produced in the reaction can be efficiently removed. Further, a colorless, transparent polycarbonate having a high molecular weight can be produced through the control of the residence time.

The second-stage reaction in the process according to the second embodiment of the present invention is usually conducted under the conditions of a reaction temperature of 220° to 350° C. and a degree of vacuum of 5 to 0.1 Torr. The residence time is 0.2 to 2 hr, preferably 0.4 to 1.2 hr, and the operation is continuously conducted. Accompanying the renewal of the surface of the reaction mixture, phenol and other by-product are removed through a distillate port connected to a vacuum system. The viscosity-average molecular weight of the polycarbonate produced by the process according to the second embodiment of the present invention is 12,000 to 60,000.

Effect of the Invention

According to the present invention, a colorless, transparent polycarbonate having a high molecular weight can be produced at a high efficiency.

EXAMPLES

The present invention will now be described in more detail with reference to the following Examples, though it is not limited to these Examples only.

Example 1

After a 20-l vessel-type agitator was charged with 4566 g (20.0 mol) of bisphenol A and 4392 g (20.5 mol) of diphenyl carbonate as the starting compounds for the reaction and 0.489 g (0.004 mol) of 4-dimethylaminopyridine and 0.039 g (0.0004 mol) of potassium acetate and the air in the reaction system was purged with nitrogen, the temperature was raised to 180° C. with agitating to melt the mixture. The reaction system was then evacuated to 2 Torr while gradually raising the temperature to 260° C. to react the starting compounds for the reaction with each other and, at the same time, to distil off phenol as a by-product. About 4 hr after the initiation of distilling off the phenol, a polycarbonate prepolymer having a viscosity-average molecular weight of 13,000 was obtained. Then, the polycarbonate prepolymer was supplied into a paddle-type self-cleaning twin-screw extruder (with L/D of 8.9, rotational diameter of paddle of 50 mm, and shaft length of 445.5 mm) at 280° C. and 0.2 Torr and discharged at a rate of 1030 g/hr by means of a gear pump so that the residence time was 35 min. The resultant polymer had a viscosity-average molecular weigh: of 28,000 and a hue ($A_{380}-A_{580}$) of 0.08. The clearance (solution thickness) of the twin-screw extruder was about 0.5 mm.

The viscosity-average molecular weight ($\overline{M}v$) was determined by measuring the intrinsic viscosity [η] of the methylene chloride solution of the polymer at 20° C. with an Ubbelohde viscometer and calculating the viscosity-average molecular weight according to the following equation:

$$[\eta]=1.11\times10^{-4}(\overline{M}v)^{0.82}$$

For the evaluation of the hue, a 10% methylene chloride solution of polycarbonate was prepared to measure the absorbances of the solution at a wavelength of 380 nm and 580 nm. The hue was expressed in the difference in the absorbance between 380 nm and 580 nm. The larger the value, the higher the intensity of coloring.

Example 2

After a 20-l vessel-type agitator was charged with 4566 g (20.0 mol) of bisphenol A and 4392 g (20.5 mol) of diphenyl carbonate as the starting compounds for the reaction and 0.489 g (0.004 mol) of 4-dimethylaminopyridine and 0.078 g (0.0008 mol) of potassium acetate and the air in the reaction system was purged with nitrogen, the temperature was raised to 180° C. with agitating to melt the mixture. The reaction system was then evacuated to 2 Torr while gradually raising the temperature to 280° C. to react the starting compounds with each other and, at the same time, to distil off phenol as a by-product. About 4 hr after the initiation of distilling off the phenol, a polycarbonate prepolymer having a viscosity-average molecular weight of 18,000 was obtained. Then, the polycarbonate prepolymer was supplied into a paddle-type self-cleaning twin-screw extruder at 280° C. and 0.2 Torr and discharged at a rate of 655 g/hr by means of a gear pump so that the residence time was 55 min. The resultant polymer had a viscosity-average molecular weight of 34,000 and a hue ($A_{280}$–$A_{580}$) of 0.09.

Comparative Example 1

A polycarbonate prepolymer prepared in the same manner as that of the Example 1 was supplied into a horizontal twin-shaft polymerizer at 280° C. and 0.2 Torr and discharged by means of a gear pump so that the residence time was 120 min. The resultant polymer had a viscosity-average molecular weight of 18,000 and a hue ($A_{380}$–$A_{580}$) of 0.65.

Comparative Example 2

A polycarbonate prepolymer prepared in the same manner as that of the Example 1 was supplied into a screw evaporator at 280° C. and 0.2 Torr and discharged by means of a gear pump so that the residence time was 12 min. The resultant polymer had a viscosity-average molecular weight of 16,000 and a hue ($A_{380}$–$A_{580}$) 0.45.

Comparative Example 3

A polycarbonate prepolymer prepared in the same manner as that of the Example 1 was supplied into a twin screw extruder at 280° C. and 0.2 Torr and discharged by means of a gear pump so that the residence time was 180 min. The resultant polymer had a viscosity-average molecular weight of 35,000. However, the hue ($A_{380}$–$A_{580}$) was 1.20, and a partially blackened scorch was observed.

Example 3

After a 20-l vessel-type agitator was charged with 4566 g (20.0 mol) of hisphenol A and 4392 g (20.5 mol) of diphenyl carbonate as the starting compounds for the reaction and 0.489 g (0.004 mol) of 4-dimethylaminopyridine and 0.039 g (0.0004 mol) of potassium acetate and the air in the reaction system was purged with nitrogen, the temperature was raised to 180° C. with agitating to melt the mixture. The reaction system was then evacuated to 2 Torr while gradually raising the temperature to 260° C. to react the starting compounds with each other and, at the same time, to distil off phenol as a by-product. About 4 hr after the initiation of distilling off the phenol, a polycarbonate prepolymer having a viscosity-average molecular weight of 13,000 was obtained. Then, the polycarbonate prepolymer was supplied into a paddle-type self-cleaning twin-screw extruder (with L/D of 8.9, rotational diameter of paddle of 50 mm, and shaft length of 445.5 mm) at 280° C. and 0.2 Torr and discharged at a rate of 800 g/hr by means of a gear pump. The residence time was about 45 min. The resultant polymer had a viscosity-average molecular weight of 30,000 and a hue ($A_{380}$–$A_{580}$) of 0.09.

Example 4

After a 20-l vessel-type agitator was charged with 4566 g (20.0 mol) of bisphenol A and 4392 g (20.5 mol) of diphenyl carbonate as the starting compounds for the reaction and 0.328 g (0.004 mol) of 2-methylimidazole and 0.033 g (0.0004 mol) of sodium acetate and the air in the reaction system was purged with nitrogen, the temperature was raised to 180° C. with agitating to melt the mixture. The reaction system was then evacuated to 2 Torr while gradually raising the temperature to 260° C. to react the starting compounds with each other and, at the same time, to distil off phenol as a by-product. About 4.5 hr after the initiation of distilling off the phenol, a polycarbonate prepolymer having a viscosity-average molecular weight of 15,000 was obtained. Then, the polycarbonate prepolymer was supplied into a paddle-type self-cleaning twin-screw extruder (with L/D of 8.9, rotational diameter of paddle of 50 mm, and shaft length of 445.5 mm) at 280° C. and 0.2 Torr and discharged at a rate of 900 g/hr by means of a gear pump. The residence time was about 40 min. The resultant polymer had a viscosity-average molecular weight of 32,000 and a hue ($A_{380}$–$A_{580}$) of 0.10.

Example 5

After a 20-l vessel-type agitator was charged with 4566 g (20.0 mol) of hisphenol A and 4392 g (20.5 mol) of diphenyl carbonate as the starting compounds for the reaction and 0.489 g (0.004 mol) of 4-dimethylamimopyridine and 0.039 g (0.0004 mol) of potassium acetate and the air in the reaction system was purged with nitrogen, the temperature was raised to 180° C. with agitating to melt the mixture. The reaction system was then evacuated to 2 Torr while gradually raising the temperature to 280° C. to react the starting compounds with each other and, at the same time, to distil off phenol as a by-product. About 4 hr after the initiation of distilling off the phenol, a polycarbonate prepolymer having a viscosity-average molecular weight of 18,000 was obtained. Then, the polycarbonate prepolymer was supplied into a paddle-type self-cleaning twin-screw extruder (with L/D of 8.9, rotational diameter of paddle of 50 mm, and shaft length of 445.5 mm) kept at 280° C. and 0.2 Torr and rotated in a ratio of the number of revolutions of blades of 2:1, and discharged at a rate of 800 g/hr by means of a gear pump. The residence time was about 55 min. The resultant polymer had a viscosity-average molecular weight of 31,000 and a hue ($A_{380}$–$A_{580}$) of 0.11.

Comparative Example 4

The procedure of the Example 3 was repeated, except that a horizontal twin-screw extruder was used instead of the paddle-type self-cleaning twin-screw extruder, the extruder was maintained under the conditions of a temperature of 280° C., a pressure of 0.2 Torr and the discharge was conducted at a rare of 800 g/hr by means of a gear pump. The residence tine was about 1.5 hr. The resultant polymer had a viscosity-average molecular weight of 19,000 and a hue ($A_{380}$–$A_{580}$) of 0.42.

Comparative Example 5

The procedure of the Example 3 was repeated, except that a screw evaporator was used instead of the paddle-type self-cleaning twin-screw extruder, the evaporator was maintained under the conditions of a temperature of 290° C., a pressure of 0.2 Torr and the discharge was conducted at a rate of 850 g/hr by means of a gear pump. The residence time was about 10 min. The resultant polymer had a viscosity-average molecular weight of 20,000 and a hue ($A_{380}$–$A_{580}$) of 0.65, and a black scorch was locally observed.

Example 6

After a 20-l vessel-type agitator was charged with 4566 g (20.0 mol) of bisphenol A and 4392 g (20.5 mol) of diphenyl carbonate as the starring compounds for the reaction and 3.28 g (0.04 mol) of 2-methylimidazole and 0.033 g (0.0004 mol) of sodium acetate and the air in the reaction system was purged with nitrogen, the temperature was raised to 180° C. with agitating to melt the mixture. The reaction system was then evacuated to 2 Torr while gradually raising the temperature to 260° C. to react the starting compounds with each other and, at the same time, to distil off phenol as a by-product. About 4 hr after the initiation of distilling off the phenol, a polycarbonate propolymer having a viscosity-average molecular weight of 13,000 was obtained. Then, the polycarbonate propolymer was transferred to a 12-l hold tank by means of a gear pump and maintained at a temperature of 260° C. in a nitrogen atmosphere. The propolymer contained in the hold tank was then supplied into a proheater by means of a gear pump, heated to 280° C. and fed into a vacuum flash chamber at a temperature of 280° C. and a pressure of 1 Torr, where the polycondensation was allowed to proceed. The viscosity-average molecular weight of the polycarbonate prepolymer at the time of the completion of this step was 20,000. Then, the polycarbonate prepolymer was supplied into a paddle-type self-cleaning twin-screw extruder (with L/D of 8.9, rotational diameter of paddle of 50 mm, and shaft length of 445.5 mm) at 280° C. and 0.2 Torr and discharged at a rate of 800 g/hr by means of a gear pump. The residence time was about 45 min. The resultant polymer had a viscosity-average molecular weight of 30,000 and a hue ($A_{380}$–$A_{580}$) of 0.101.

Example 7

A polycarbonate prepolymer having a viscosity-average molecular weight of 11,000 was prepared under the same charging condition as that of the Example 6 through the use of the same vessel-type agitator as that of the Example 6, except that 4.88 g (0.04 mol) of 4-dimethylaminopyridine was used as the catalyst instead of the 2-methylimidazole. The prepolymer was fed by means of a gear pump into a vessel-type agitator of the type as described above, where the polycondensation was allowed to further proceed, thereby preparing a polycarbonate prepolymer having a viscosity-average molecular weight of 15,000. The prepolymer was fed into a preheater by means of a gear pump, heated to 280° C., fed into a vacuum flash chamber at a temperature of 280° C. and a pressure of 1 Torr, where the polycondensation was allowed to proceed. The viscosity-average molecular weight of the polycarbonate prepolymer at the time of the completion of this step was 22,000. Then, the polycarbonate prepolymer was supplied into a paddle-type self-cleaning twin-screw extruder at 280° C. and 0.2 Torr and discharged at a rate of 900 g/hr by means of a gear pump. The resultant polymer had a viscosity-average molecular weight of 29,000 and a hue ($A_{380}$–$A_{580}$) of 0.105.

Comparative Example 6

The procedure of the Example 6 was repeated, except that a horizontal twin-screw extruder was used instead of the paddle-type self-cleaning twin-screw extruder, the extruder was maintained under the conditions of a temperature of 280° C., a pressure of 0.2 Torr and the discharge was conducted at a rate of 800 g/hr by means of a gear pump. The residence tine was about 3 hr. The resultant polymer had a viscosity-average molecular weight of 22,000 and a hue ($A_{380}$–$A_{580}$) of 0.27.

Comparative Example 7

The procedure of the Example 6 was repeated, except that a screw evaporator was used instead of the paddle-type self-cleaning twin-screw extruder, the evaporator was maintained under the conditions of a temperature of 280° C., a pressure of 0.2 Torr and the discharge was conducted at a rate of 900 g/hr by means of a gear pump. The residence time was about 10 min. The resultant polymer had a viscosity-average molecular weight of 24,000 and a hue ($A_{380}$–$A_{580}$) of 0.50, and a black scorch was locally observed.

Example 8

4566 g (20.0 mol) of bisphenol A and 4392 g (20.5 mol) of diphenyl carbonate were melted in a vessel for melting staring compounds, and fed into a 20-l horizontal twin-shaft polymerizer. The air present inside the horizontal twin-shaft polymerizer was purged with nitrogen, and 3.28 g (0.04 mol) of 2-methylimidazole and 0.033 g (0.0004 mol) of sodium acetate were added as a catalyst at 180° C. with agitating. The reaction system was evacuated to 2 Torr while gradually raising the temperature to 260° C. to react the starting compounds with each other and, at the same time, to distil off phenol as a by-product. About 4 hr after the initiation of distilling off the phenol, a polycarbonate prepolymer having a viscosity-average molecular weight of 16,000 was obtained. Then, the polycarbonate prepolymer was transferred to a 12-l hold tank by means of a gear pump and maintained at a temperature of 260° C. in a nitrogen atmosphere. The prepolymer contained in the hold tank was then fed, by means of a gear pump, into a paddle-type self-cleaning twin-screw extruder (with L/D of 8.9, rotational diameter of paddle of 50 mm, and shaft length of 445.5 mm) at a pressure of 0.2 Torr and discharged at a raze of 800 g/hr by means a gear pump. The residence time was about 45 min. The resultant polymer had a viscosity-average molecular weight of 30,000 and a hue ($A_{380}$–$A_{580}$) of 0.100.

Example 9

A 20-l horizontal twin-shaft polymerizer was charged with the starting compounds in the same manner as that of the Example 8, except that 4.88 g (0.04 mol) of 4-dimethylaminopyridine was used as the catalyst instead of the 2-methylimidazole. After the air present inside the horizontal twin-shaft polymerizer was purged with nitrogen, the reaction system was evacuated to 4 Torr with agitating while gradually raising the temperature from 180° to 260° C. to react the starting compounds with each other and, at the same time, to distil off phenol as a by-product. About 4 hr after the initiation of distilling off the phenol, a polycarbonate prepolymer having a viscosity-average molecular weight of 13,000 was obtained. Then, the polycarbonate prepolymer was fed into a horizontal twin-shaft polymerizer of the type as described above, where the polycondensation was allowed to proceed under the conditions of a temperature of 280° C. and a pressure of 2 Torr. The resultant prepolymer had a viscosity-average molecular weight of 19,000. The prepolymer was then fed into a paddle-type self-cleaning twin-screw extruder at a temperature of 280° C. and a pressure of 0.2 Torr and discharged at a rate of 800 g/hr by means of a gear pump. The residence time was about 45 min. The resultant polymer had a viscosity-average molecular weight of 32,000 and a hue ($A_{380}$–$A_{580}$) of 0.090.

Comparative Example 8

The procedure of the Example 8 was substantially repeated, except that a horizontal twin-shaft polymerizer was used instead of the paddle-type self-cleaning twin-screw extruder, the polymerizer was maintained under the conditions of a temperature of 280° C., a pressure of 0.2 Torr and the discharge was conducted at a rate of 800 g/hr by means of a gear pump. The residence time was about 3 hr. The resultant polymer had a viscosity-average molecular weight of 25,000 and a hue ($A_{380}$–$A_{580}$) of 0.17.

Comparative Example 9

The procedure of the Example 8 was substantially repeated, except that a screw evaporator was used instead of the paddle-type self-cleaning twin-screw extruder, the evaporator was maintained under the conditions of a temperature of 280° C., a pressure of 0.2 Torr and the discharge was conducted at a rare of 900 g/hr by means of a gear pump. The residence time was about 10 min. The resultant polymer had a viscosity-average molecular weight of 24,000 and a hue ($A_{380}$–$A_{580}$) of 0.20, and a black scorch was locally observed.

Example 10

After a 20-l vessel-type agitator was charged with 4588 g (20.0 mol) of hisphenol A and 4392 g (20.5 mol) of diphenyl carbonate as the starting compounds for the reaction and 3.28 g (0.04 mol) of 2-methylimidazole and 0.033 g (0.0004 mol) of sodium acetate and the air in the reaction system was purged with nitrogen, the temperature was raised to 180° C. with agitating to melt the mixture. The reaction system was then evacuated to 2 Torr while gradually raising the temperature to 260° C. to react the starting compounds with each other and, at the same time, to distil off phenol as a by-product. About 4 hr after the initiation of distilling off the phenol, a polycarbonate prepolymer having a viscosity-average molecular weight of 13,000 was obtained. Then, the polycarbonate prepolymer was transferred to a 12-l hold tank by means of a gear pump and maintained at a temperature of 260° C. in a nitrogen atmosphere. The prepolymer contained in the hold tank was then supplied into a-vented extruder by means of a gear pump, and the polycondensation was allowed to proceed under the conditions of a temperature of 280° C. and a pressure of 1 Torr. The viscosity-average molecular weight of the polycarbonate prepolymer at the time of the completion of this step was 19,000. Then, the prepolymer was supplied, by means of a gear pump, into a paddle-type self-cleaning twin-screw extruder (with L/D of 8.9, rotational diameter of paddle of 50 mm, and shaft length of 445.5 mm) at 280° C. and 0.2 Torr and discharged at a rate of 800 g/hr by means of a gear pump. The residence time was about 45 min. The resultant polymer had a viscosity-average molecular weight of 29,000 and a hue ($A_{380}$–$A_{580}$) of 0.105.

Example 11

A polycarbonate prepolymer having a viscosity-average molecular weight of 11,000 was prepared under the same charging condition as that of the Example 10 through the use of the same vessel-type agitator as that of the Example 10, except that 4.88 g (0.04 mol) of 4-dimethylaminopyridine was used as the catalyst instead of the 2-methylimidazote. The prepolymer was fed, by means of a gear pump, into a vessel-type agitator of the type as described above, where the polycondensation was further allowed to proceed, thereby preparing a polycarbonate prepolymer having a viscosity-average molecular weight of 15,000. The prepolymer was then fed into a vented extruder by means of a gear pump, and the polycondensation was allowed to proceed under the conditions of a temperature of 280° C. and a pressure of 1 Torr. The viscosity-average molecular weight of the polycarbonate prepolymer at the time of the completion of this step was 20,000. Then, the prepolymer was supplied, by means of a gear pump, into a paddle-type self-cleaning twin-screw extruder at 280° C. and 0.2 Torr and discharged at a rate of 900 g/hr by means of a gear pump. The resultant polymer had a viscosity-average molecular weight of 28,000.

Comparative Example 10

The procedure of the Example 10 was substantially repeated, except that a horizontal twin-shaft polymerizer was used instead of the paddle-type self-cleaning twin-screw extruder, the polymerizer was maintained under the conditions of a temperature of 280° C., a pressure of 0.2 Torr and the discharge was conducted at a rate of 800 g/hr by means of a gear pump. The residence time was about 3 hr. The resultant polymer had a viscosity-average molecular weight of 23,000 and a hue ($A_{380}$–$A_{580}$) of 0.38.

Comparative Example 11

The procedure of the Example 10 was substantially repeated, except that a screw evaporator was used instead of the paddle-type self-cleaning twin-screw extruder, the evaporator was maintained under the conditions of a temperature of 280° C., a pressure of 0.2 Torr and the discharge was conducted at a rate of 900 g/hr by means of a gear pump. The residence time was about 10 min. The resultant polymer had a viscosity-average molecular weight of 23,000 and a hue ($A_{380}$–$A_{580}$) of 0.55, and a black scorch was locally observed.

Example 12

After a 20-l vessel-type agitator was charged with 4566 g (20 mol) of bisphenol A and 4392 g (20.5 mol) of diphenyl carbonate as the starting compounds and 4.88 g (0.04 mol) of 4-dimethylaninopyridine and 0.033 g (0.0004 mol) of sodium acetate as catalysts and the air in the reaction system was purged with nitrogen, the temperature was raised to 180° C. with agitating to melt the mixture. Then, the mixture of the starting compounds and the catalysts was fed into a 20-l vessel-type reactor equipped with a distillation column, and the vessel was evacuated to 2 Torr while gradually raising the temperature from 180° to 260° C. to react the starting compounds with each other and, at the same time, to distil off phenol as a by-product. About 4 hr after the initiation of distilling off the phenol, a polycarbonate prepolymer having a viscosity-average molecular weight of 13,000 was obtained. Then, the polycarbonate prepolymer was fed, by means of a gear pump, into a paddle-type self-cleaning twin-screw extruder (with L/D of 8.9, rotational diameter of paddle of 50 mm, and shaft length of 445.5 mm) at 280° C. and 0.2 Torr and discharged at a rate of 850 g/hr by means of a gear pump. The residence time was about 45 min. The viscosity-average molecular weight ($\overline{M}v$) of the resultant polycarbonate was measured and found to be 28,000. The hue ($A_{380}$–$A_{580}$) of the polycarbonate was 0.110.

Example 13

After a polycarbonate prepolymer having a viscosity-average molecular weight of 13,000 was prepared in the same manner as that of the Example 12, the polycarbonate prepolymer was transferred to a 20-l vessel-type reactor by means of a gear pump, where the polycondensation was allowed to further proceed under the conditions of a temperature of 280° C. and a pressure of 1 Torr. The viscosity-average molecular weight of the polycarbonate prepolymer at the time of the completion of this step was 20,000. Then, the prepolymer was supplied, by means of a gear pump, into a paddle-type self-cleaning twin-screw extruder (with L/D of 8.9, rotational diameter of paddle of 50 mm, and shaft length of 445.5 mm) at 280° C. and 0.2 Torr and discharged at a rate of 800 g/hr by means of a gear pump. The residence time was about 45 min. The viscosity-average molecular weight ($\overline{M}v$) of the resultant polycarbonate was measured and found to be 27,000. The hue ($A_{380}$–$A_{580}$) of the polycarbonate was 0.101.

Example 14

A polycarbonate prepolymer having a viscosity-average molecular weight of 14,000 was prepared under the same charging conditions as those of the Example 12 except for the use of 3.28 g (0.04 mol) of 2-methylimidazole as the catalyst instead of the 4-dimethylaminopyridine through the use of a vessel-type agitator and a vessel-type reactor provided with a distillation column of the same type as those used in the Example 12. The prepolymer was transferred, by means of a gear pump, to a vessel-type reactor of the type as described above, where the polycondensation was allowed to further proceed to give a polycarbonate prepolymer having a viscosity-average molecular weight of 18,000. The prepolymer was then fed, by means of a gear pump, into a paddle-type self-cleaning twin-screw extruder at a temperature of 280° C. and a pressure of 0.2 Torr and discharged at a rate of 900 g/hr by means of a gear pump. The resultant polymer had a viscosity-average molecular weight of 29,000 and a hue ($A_{380}$–$A_{580}$) of 0.105.

Example 15

The procedure up to the reaction in the vessel-type reactor was conducted under the same charging and reaction conditions as those of the Example 12 to prepare a polycarbonate prepolymer having a viscosity-average molecular weight of 14,000. This prepolymer was fed, by means of a gear pump, into a horizontal polymerizer, where a reaction was allowed to proceed under the conditions of a temperature of 280° C. and a pressure of 1 Torr to give a polycarbonate prepolymer having a viscosity-average molecular weight of 20,000, which was then fed, by means of a gear pump, into a paddle-type self-cleaning twin-screw extruder at a Temperature of 280° C. and a pressure of 0.2 Torr and discharged at a rate of 900 g/hr. The viscosity-average molecular weight of the resultant polymer was 30,000. The hue ($A_{380}$–$A_{580}$) was 0.102.

Comparative Example 12

The first-stage reaction was conducted in the same manner as that of the Example 13 to give a polycarbonate prepolymer, which was then fed into a horizontal twin-shaft polymerizer instead of the paddle-type self-cleaning twin-screw extruder and discharged at a rate of 800 g/hr by means of a gear pump under the conditions of a temperature of 280° C. and a pressure of 0.2 Torr. The residence time was about 3 hr. The viscosity-average molecular weight of the resultant polymer was 22,000. The hue ($A_{380}$–$A_{580}$) was 0.27.

Comparative Example 13

The first-stage reaction was conducted in the same manner as that of the Example 13 to give a polycarbonate prepolymer, which was then fed into a screw evaporator instead of the paddle-type self-cleaning twin-screw extruder and discharged under the conditions of a temperature of 300° C. and a pressure of 0.2 Torr at a rate of 900 g/hr by means of a gear pump. The residence time was about 10 min. The viscosity-average molecular weight of the resultant polymer was 24,000. The hue ($A_{380}$–$A_{580}$) was 0.50, and a black scorch was locally observed.

We claim:

1. A process for producing a polycarbonate by subjecting a dihydroxy compound and a diester of carbonic acid to melt polycondensation through transesterification, characterized in that after a polycarbonate prepolymer is prepared in the first-stage reaction, polycondensation is conducted as the second-stage reaction through the use of at least one paddle-type self-cleaning twin-screw extruder.

2. The process for producing a polycarbonate according to claim 1, wherein a plurality of blades of said paddle self-cleaning twin-screw extruder are rotated so as to be different from each other in the number of revolutions.

3. The process for producing a polycarbonate according to claim 1, wherein the viscosity-average molecular weights of the polycarbonate prepolymer and the polycarbonate obtained are 5,000 to 20,000 and 12,000 to 60,000, respectively.

4. The process for producing a polycarbonate according to claim 1, wherein the first-stage reaction is conducted by any of the following methods (a) to (i):

(a) a method wherein the starting compounds for the reaction are subjected to polycondensation in a molten state in at least one vessel while distilling off phenol or other compound produced in the reaction;

(b) a method which comprises the first step of subjecting the starting compounds for the reaction to polycondensation in a molten state in at least one vessel to give a polycarbonate prepolymer having a viscosity-average molecular weight of 5,000 to 2,000 while distilling off phenol or other compound produced in the reaction, the second step of placing the prepolymer produced in the first step in at least one hold tank, and the third step of introducing the prepolymer produced in the second step through at least one preheater into a vacuum flash chamber, where the prepolymer is subjected to polycondensation while distilling off phenol or other compound produced in the reaction to give a polycarbonate prepolymer having a viscosity-average molecular weight of 10,000 to 30,000;

(c) a method which comprises the first step of subjecting the starting compounds for the reaction to polycondensation in a molten state in at least one vessel to give a polycarbonate prepolymer having a viscosity-average molecular weight of 5,000 to 20,000 while distilling off phenol or other compound produced in the reaction and the second step of introducing the prepolymer produced in the first step through at least one preheater into a vacuum flash chamber, where the prepolymer is subjected to polycondensation while distilling off phenol or other compound produced in the reaction to give a polycarbonate propolymer having a viscosity-average molecular weight of 10,000 to 30,000;

(d) a method which comprises the first step of melting the starting compounds for the reaction in a vessel for melting starting compounds, the second step of subjecting the starting compounds for the reaction to polycondensation in a horizontal twin-shaft polymerizer to give a polycarbonate propolymer having a viscosity-average molecular weight of 5,000 to 30,000 while distilling off phenol or other compound produced in the reaction, and the third step of placing the propolymer produced in the second step in at least one hold tank;

(e) a method which comprises the first step of melting the starting compounds for the reaction in a vessel for melting starting compounds and the second step of subjecting the starting compounds for the reaction to polycondensation in a horizontal twin-shaft polymerizer to give a polycarbonate propolymer having a viscosity-average molecular weight of 5,000 to 30,000 while distilling off phenol or other compound produced in the reaction;

(f) a method which comprises the first step of subjecting the starting compounds for the reaction to polycondensation in a molten state in at least one vessel to give a polycarbonate prepolymer having a viscosity-average molecular weight of 5,000 to 20,000 while distilling off phenol or other compound produced in the reaction, the second step of placing the prepolymer produced in the first step in at least one hold tank, and the third step of subjecting the prepolymer to polycondensation in at least one vented extruder while distilling off phenol or other compound produced in the reaction to give a polycarbonate prepolymer having a viscosity-average molecular weight of 10,000 to 30,000;

(g) a method which comprises the first step of subjecting the starting compounds for the reaction to potycondensation in a molten state in at least one vessel to give a polycarbonate prepolymer having a viscosity-average molecular weight of 5,000 to 20,000 while distilling off phenol or other compound produced in the reaction and the second step of subjecting the prepolymer to polycondensation in at least one vented extruder while distilling off phenol or other compound produced in the reaction to give a polycarbonate prepolymer having a viscosity-average molecular weight of 10,000 to 30,000;

(h) a method which comprises the first step of melting the starting compounds for the reaction in a vessel for melting the starting compounds and the second step of subjecting the starting compounds for the reaction to polycondensation in at least one vessel to give a polycarbonate prepolymer having a viscosity-average molecular weight of 5,000 to 30,000 while distilling off phenol or other compound produced in the reaction; and (i) a method which comprises the first step of melting the starting compounds for the reaction in a vessel for melting the starting compounds, the second step of subjecting the starting compounds for the reaction to polycondensation in at least one vessel to give a polycarbonate prepolymer having a viscosity-average molecular weight of 5,000 to 20,000 while distilling off phenol or other compound produced in the reaction and the third step of allowing the polycondensation of the prepolymer produced in the second step to further proceed in at least one vessel and/or at least one horizontal polymerizer while distilling off phenol or other compound produced in the reaction to give a polycarbonate propolymer having a viscosity-average molecular weight of 10,000 to 30,000.

* * * * *

UNITED STATES PATENT AND TRADEMARK OFFICE
CERTIFICATE OF CORRECTION

PATENT NO. : 5,610,262
DATED : March 11, 1997
INVENTOR(S) : Tsutomu YAMATO et al It is certified that error appears in the above-indentified patent and that said Letters Patent is hereby corrected as shown below:

Column 23, line 12; change "propolymer" to ---prepolymer---.

Column 23, line 19; change "propolymer" to ---prepolymer---.

Column 23, line 23; change "propolymer" to ---prepolymer---.

Column 23, line 30; change "propolymer" to ---prepolymer---.

Column 24, line 6; change "potyconden-" to ---polyconden- ---.

Column 24, line 40; change "propolymer" to ---prepolymer---.

Signed and Sealed this

Ninth Day of September, 1997

Attest:

BRUCE LEHMAN

Attesting Officer

Commissioner of Patents and Trademarks